(12) United States Patent
Williamson

(10) Patent No.: US 11,878,560 B1
(45) Date of Patent: Jan. 23, 2024

(54) MODULAR WHEEL AND SUSPENSION ASSEMBLY

(71) Applicant: Richard Leslie Williamson, Ocala, FL (US)

(72) Inventor: Richard Leslie Williamson, Ocala, FL (US)

(*) Notice: Subject to any disclaimer, the term of this patent is extended or adjusted under 35 U.S.C. 154(b) by 0 days.

(21) Appl. No.: 18/204,418

(22) Filed: Jun. 1, 2023

(51) Int. Cl.
| | |
|---|---|
| *B60D 1/46* | (2006.01) |
| *B60G 17/015* | (2006.01) |
| *B60G 3/20* | (2006.01) |
| *B62D 61/12* | (2006.01) |
| *B62D 63/08* | (2006.01) |

(52) U.S. Cl.
CPC ........... *B60G 17/0152* (2013.01); *B60D 1/46* (2013.01); *B60G 3/207* (2013.01); *B62D 61/12* (2013.01); *B60G 2202/15* (2013.01); *B60G 2300/04* (2013.01); *B60G 2500/30* (2013.01); *B62D 63/08* (2013.01)

(58) Field of Classification Search
CPC ................ B60G 17/0152; B60G 3/207; B60G 2202/15; B60G 2300/04; B60G 2500/30; B60D 1/46; B62D 61/12; B62D 63/08
See application file for complete search history.

(56) References Cited

U.S. PATENT DOCUMENTS

| | | | | | |
|---|---|---|---|---|---|
| 3,429,585 | A | * | 2/1969 | Ross ..................... | B62D 53/065 |
| | | | | | 280/43.23 |
| 8,182,193 | B2 | * | 5/2012 | Gaudet .................. | B60G 3/145 |
| | | | | | 280/6.151 |
| 8,226,098 | B2 | * | 7/2012 | VanDenberg .......... | B60G 21/05 |
| | | | | | 301/124.1 |
| 8,328,211 | B2 | * | 12/2012 | VanDenberg .......... | B60G 9/003 |
| | | | | | 280/124.128 |
| 9,725,024 | B1 | * | 8/2017 | Davis .................... | B62D 63/061 |
| 11,351,903 | B1 | * | 6/2022 | Williamson ............ | B60P 1/027 |
| 2011/0299963 | A1 | * | 12/2011 | Aubrey ................... | B60P 1/027 |
| | | | | | 414/484 |
| 2012/0181760 | A1 | * | 7/2012 | Catford ................... | B60P 1/027 |
| | | | | | 280/43.18 |

* cited by examiner

*Primary Examiner* — Kevin Hurley
*Assistant Examiner* — Marlon A Arce
(74) *Attorney, Agent, or Firm* — SALIWANCHIK, LLOYD & EISENSCHENK

(57) ABSTRACT

A modular wheel and suspension assembly (MWSA) to provide mobility to a load for towing. The MWSA can have a fender housing and a suspension arm and suspension mechanism that is rotated toward a pivot arm with a suspension mount that engages with the suspension mechanism and a wheel. The suspension arm can be rotatably attached to the fender housing. A linear actuator can rotate the suspension arm to raise the fender housing while deploying the wheel from the fender housing. Rotating the suspension arm in the opposite direction causes the fender housing to be lowered over the wheel and the load to be lowered as the wheel retracts into the fender housing. The MWSA can have a rotary tongue system with an operable connection to the suspension arm. Rotating the suspension arm lowers and raises a tongue when the wheel is deployed from or retracted into the fender housing.

25 Claims, 13 Drawing Sheets

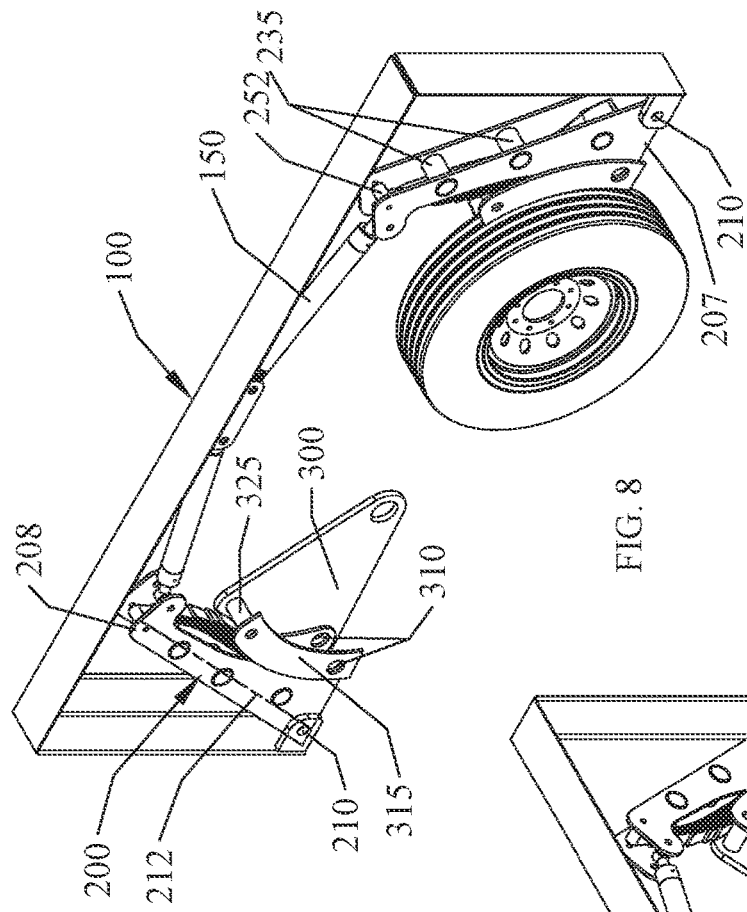
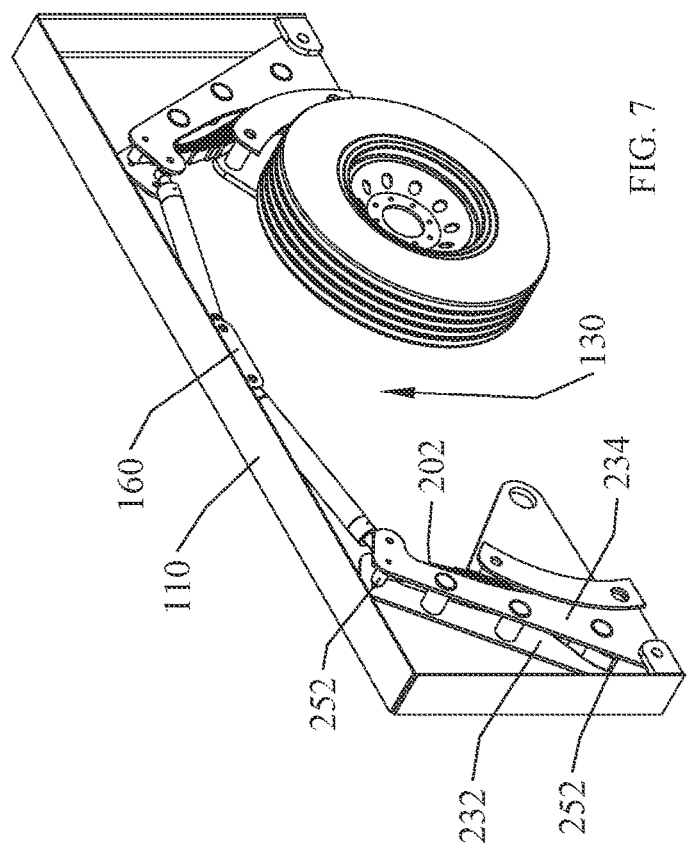
FIG. 8
FIG. 7

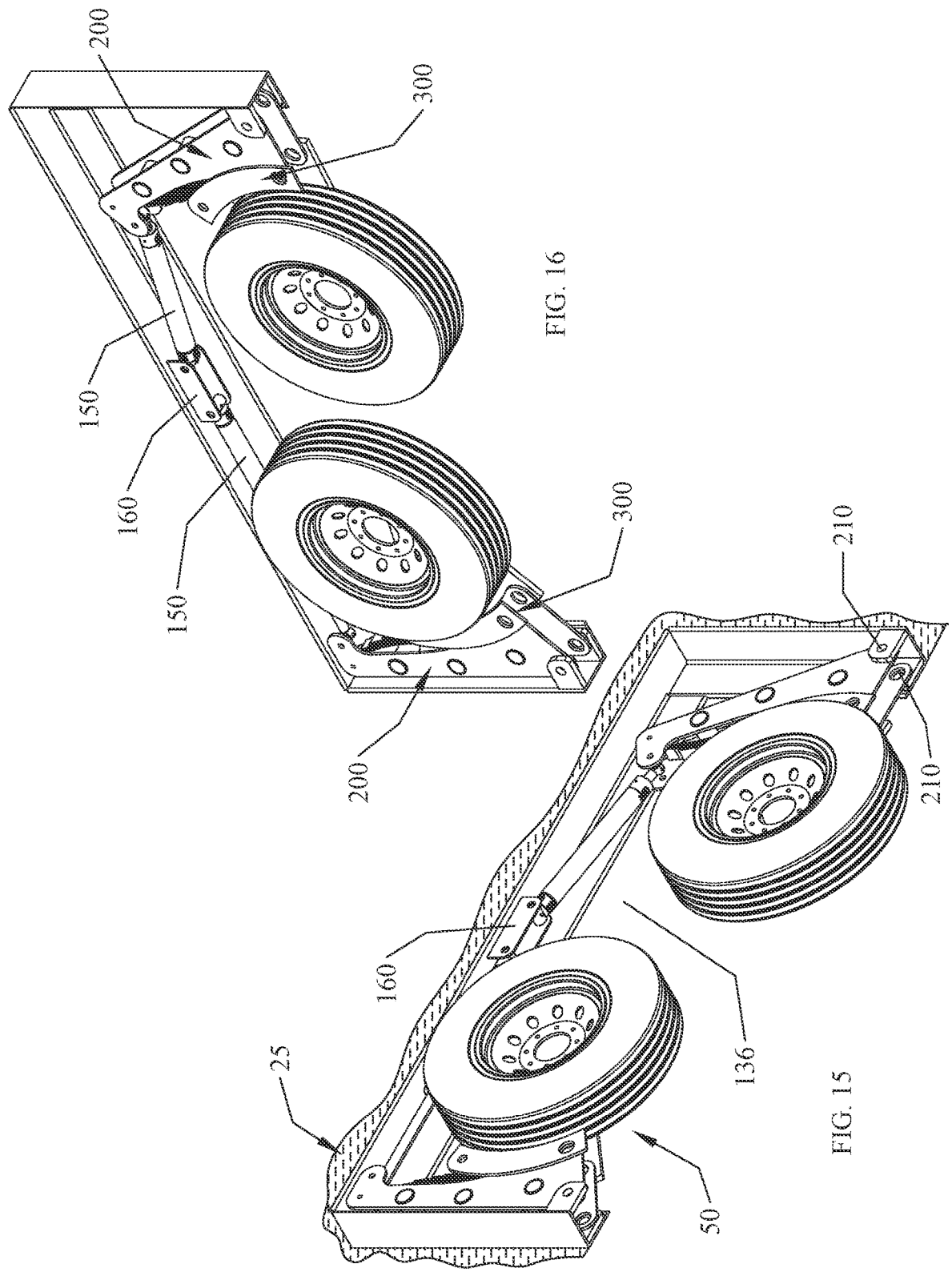

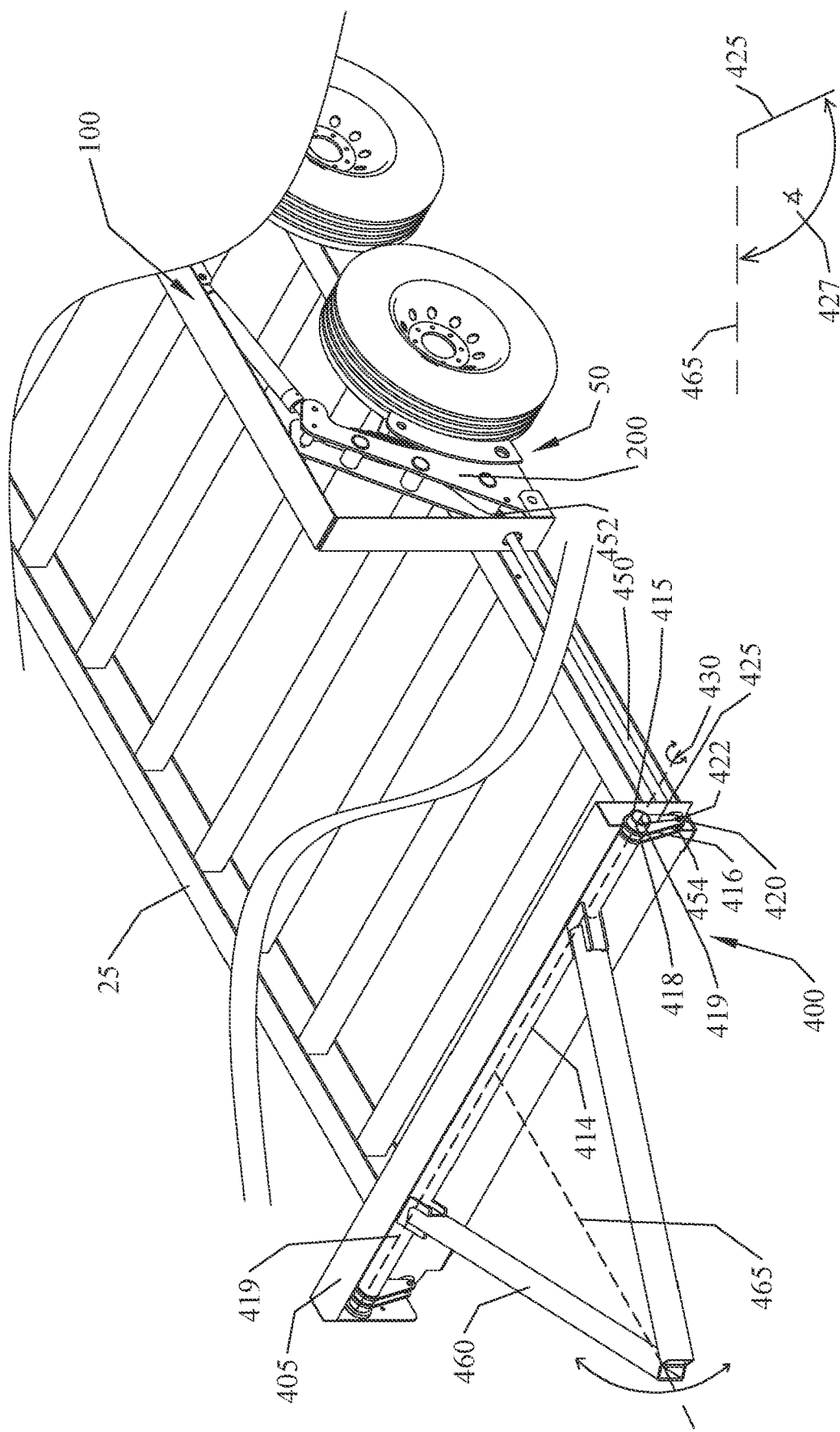

MODULAR WHEEL AND SUSPENSION ASSEMBLY

BACKGROUND OF INVENTION

Everyday thousands of trailers are used around the world to transport loads from one place to another. This often requires towing not only the load, but also the trailer. The heavier the load the sturdier the required trailer construction, which adds weight to the total load being transported. Vehicles also have towing capacities, so the heavier the combined weight of the trailer and load, the larger a vehicle required for transport. Larger vehicles require more fuel resulting in greater cost to transport the load.

There is also the issue of loading a trailer, which requires stepping up onto or extending over the trailer floor with the load or, alternatively, utilizing a ramp placed against the trailer floor to drive or carry the load onto the trailer floor. Either option can be dangerous and time-consuming and a ramp or other loading equipment is often transported on the trailer for use at the next location, which adds to the weight being towed.

Given the current environmental concerns and the rising cost of fuel, there is a need to reduce fuel consumption. One way to address this issue is to reduce the weight being transported by the thousands of trailers every day. If a load can be modified with wheels for towing, the trailer weight could be eliminated. This can reduce the weight being transported and the vehicle fuel consumption. This can also address the safety issues by eliminating the need for a trailer.

BRIEF SUMMARY

In accordance with the subject invention, the problem of pulling or towing a load is solved by a modular wheel and suspension assembly that can be attached to the load to impart independent towability to the load. The modular wheel and suspension assembly can be permanently or removably attached to a load. Advantageously, the modular wheel and suspension assembly can be used to lower the height of the load relative to ground level or to "kneel" a load fully to ground level. This can make it easier to attach or remove a modular wheel and suspension assembly. This can also make them advantageous for use on trailers, as it allows the trailer floor or platform to be lowered for easier loading. The height of the load can also be adjusted to reduce drag and improve fuel consumption. Further, the advantageous articulation of the components of the modular wheel and suspension assembly allow for easy access and repair.

One or more modular wheel and suspension assemblies can be mounted within or enclosed within a fender housing. The fender housing can include an outside frame wall that can define an inner wheel well. The frame wall can also support one or more frame panels arranged on a back side of the frame wall or an inner side of the wheel well. Components of the modular wheel and suspension assembly can be mounted on the frame wall and/or the frame panels, utilizing devices known in the art, and the fender housing can be removably or permanently attached to a load. The dimensions of a fender housing can be made to accommodate one or more modular wheel and suspension assemblies mounted therein. Modularity is provided by the ability to utilize different combinations of the modular wheel and suspension assembly to be attached to different loads. For example, a fender housing can have dimensions that support at least one, at least two, or at least three modular wheel and suspension assemblies. Further, each modular wheel and suspension system within a fender housing can operate independently. Alternatively, one or more actuators can be configured to operate the modular wheel and suspension systems within a fender housing, such that multiple modular wheel and suspension systems can be operated together. For the sake of clarity and brevity, embodiments of a modular wheel and suspension assembly are described herein relative to a fender housing. A person of skill in the art will recognize that the components of a modular wheel and suspension assembly could be utilized without a fender housing by attachment directly to a load. Such variations are within the scope of the subject invention.

A modular wheel and suspension assembly can have a suspension arm that can be attached to the fender housing at an attachment point. The suspension arm can freely rotate on the attachment point. The suspension arm can also anchor the other articulating components of a modular wheel and suspension system to the fender housing. Attached to the suspension arm there can be a suspension mechanism for absorbing energy from the wheel, described below.

A pivot arm can be pivotally attached to the suspension arm at a pivot point around which the pivot arm can freely rotate. A wheel can be operably attached by a stub axle to the pivot arm and the pivot arm can further operably engage with the suspension mechanism on the suspension arm. In particular, the pivot arm can have a suspension that contacts the suspension mechanism. The suspension system can comprise the suspension mount and the suspension mechanism. When the wheel attached to the pivot arm is supported on the ground or at a ground level, gravity can cause the suspension arm to rotate toward the pivot arm, placing the suspension mount in operable connection with the suspension mechanism. Alternatively, the suspension mechanism and the suspension mount can be held together, with a bracket, U-bolt, banding, or other securing device, to hold the pivot arm in proximity to or against the suspension arm, so that the suspension mount is near to or against the suspension mechanism. This arrangement will allow the pivot arm to rotate in tandem with the suspension arm during use. If necessary, such as for repair, the securing device can be removed so that the pivot arm can freely rotate.

As described above, when the wheel rests at ground level, gravity can act on the modular wheel and suspension assembly. The rotatable connections of the wheel to the pivot arm, the pivot arm to the suspension arm, and the suspension arm to the fender housing facilitate the components being able to collapse or come together, so that the fender housing also drops or kneels to at or about ground level. A load attached to the fender housing can likewise be dropped or kneeled with the fender housing, or the load can be attached when the fender housing is kneel. In a collapsed or kneeling position, the suspension arm can be pushed by the pivot arm to a fully upright position so the wheel can be retracted into the wheel well of the fender housing.

An actuator can be operably attached to an actuation point distanced from the attachment point on the suspension arm. In a particular embodiment, the suspension arm has a longitudinal length and the attachment point is at or near one end of the longitudinal length and the actuation point is at or near an opposite end of the longitudinal length. In a more particular embodiment, the suspension arm is operably attached at the attachment point to the fender housing. The attachment point can also be lower in on the suspension arm than the actuation point or, stated another way, is closer to ground level than the actuation point.

The actuator can control the position of the wheel, relative to the fender housing, by exerting force on the actuation point of the suspension arm to forcibly rotate or tilt the suspension arm into the wheel well or toward the pivot arm and wheel. Thus, the position or articulation of the components of the modular wheel and suspension assembly can be controlled by the actuator. The actuator tilt or rotate the suspension arm to force the suspension mechanism against the suspension mount, thereby forcing the attachment point upwards, which likewise raises the fender housing and a load attached thereto. Stated another way, by the application of force from an actuator, the suspension arm can act as a lever with the suspension mount of the pivot arm acting as a fulcrum, to raise or lower the fender housing attached at the attachment point, which is lower or closer to ground level than the actuation point. In one embodiment, the actuator is a linear actuator attached to or within a fender housing, as a component of the modular wheel and suspension assembly.

A load is usually towed by a vehicle typically, though not exclusively, by attachment of a tongue to ball hitch on the vehicle and to the load at the opposite end of the tongue. When a load is kneeled with a modular wheel and suspension system of the subject invention, the tongue can tilt on the ball hitch, but may not be able to tilt or rotate fully to ground level.

This problem can be solved with a rotary tongue system of the subject invention. The rotary tongue system can operate cooperatively with the modular wheel and suspension system and, in certain embodiments, can be incorporated therewith. Advantageously, the rotary tongue system allows the tongue of the trailer to remain attached to a towing vehicle while the load is kneeled to ground level or raised to towing height.

In a select embodiment, the rotary tongue can have an operable connection to the suspension arm, which can control the position of the rotatable tongue. When the actuator is activated to tilt or rotate the suspension arm against the pivot arm, the rotary tongue can simultaneously be positioned in a substantially horizontal position suitable for towing. When the actuator allows the suspension arm to move away from the pivot arm, releasing force thereon to kneel the load, the suspension arm can rotate upright causing the rotary tongue to angle downwards as the load is kneeled.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description are specific to the embodiments disclosed. Any variations of these dimensions that will allow the subject invention to function for its intended purpose are considered within the scope of the subject invention. Thus, understanding that these drawings depict only typical embodiments of the invention and are not therefore to be considered as limiting in scope, the invention will be described and explained with additional specificity and detail through use of the accompanying drawings in which:

FIG. 7 illustrates an upper end, left front perspective view of an alternative embodiment of a modular wheel and suspension assembly with tandem wheels, according to the subject invention. In this view, the left wheel is not shown.

FIG. 8 illustrates an upper end, right front perspective view of an alternative embodiment of a modular wheel and suspension assembly with tandem wheels, according to the subject invention. In this view, the left wheel is not shown.

FIG. 15 illustrates a lower end, left front perspective view of an alternative embodiment of a modular wheel and suspension assembly with tandem wheels, according to the subject invention. In this view, the left wheel is shown in a raised or kneeling position.

FIG. 16 illustrates a lower end, right front perspective view of an alternative embodiment of a modular wheel and suspension assembly with tandem wheels, according to the subject invention. In this view, the left wheel is shown in a raised or kneeling position.

FIG. 23 illustrates a top right perspective view of an embodiment of a modular wheel and suspension system that has an operable connection to a rotary tongue system, according to the subject invention.

FIG. 24 is a representation of the line of operational distance and the center line of the tongue to show the angle of attachment therebetween.

DETAILED DISCLOSURE

Figure 1:
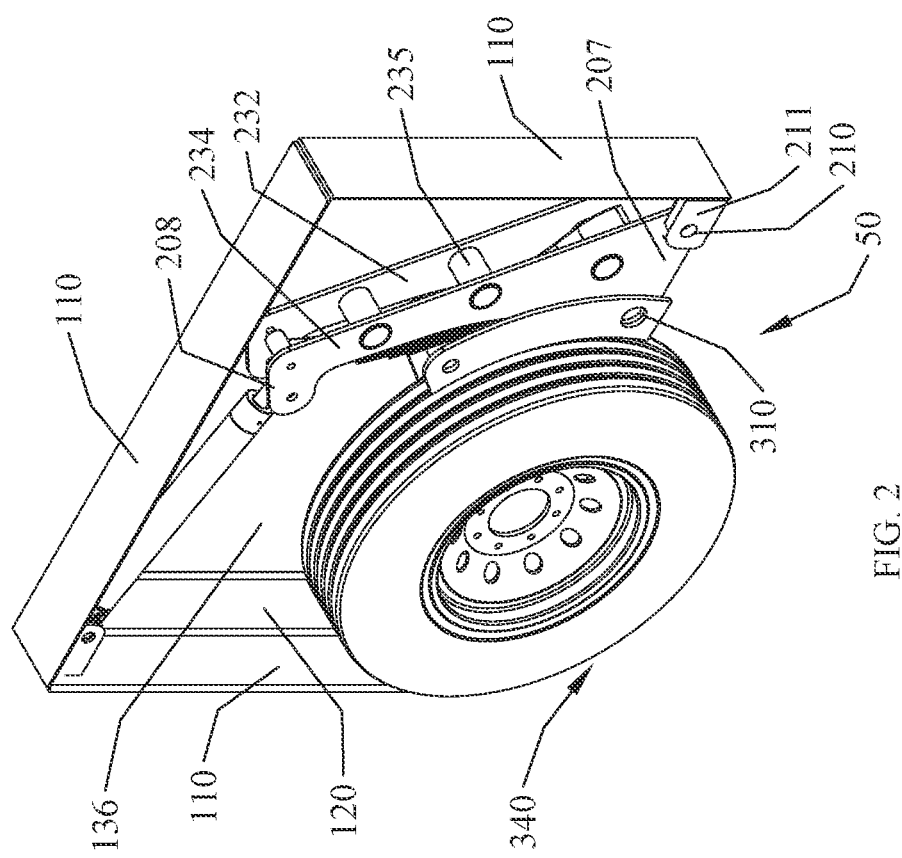
FIG. 1 illustrates an upper end, front left perspective view of an embodiment of a modular wheel and suspension assembly, according to the subject invention.

The subject invention addresses the problem of towing large or heavy loads without a trailer by the attachment of wheels and a suspension system directly to the load. More specifically, the subject invention provides one or more embodiments of an independent, modular wheel and suspension assembly (herein referred to as "MWSA") that can be attached to a load to engender towability to the load. One advantage of an MWSA of the subject invention is the ability to raise or lower a load relative to a ground level. This can also allow the MWSA to be attached to loads at different heights, including a load sitting at ground level. Once attached, the load can be raised with the modular wheel and suspension system to a height for rolling or towing. Another advantage of the MWSA of subject invention is the arrangement of the components, which provides convenient accessibility for installation and repair.

Embodiments of the modular wheel and suspension system are advantageous for moving or towing loads that are typically transported on a trailer or within a vehicle. As the ordinary artisan can readily envision the subject invention can have other uses. Thus, while the subject application describes, and many of the terms herein relate to, a use for providing wheels for towability, the subject invention can be utilized whenever and wherever a wheel and suspension system would be beneficial.

In the description that follows, terms are utilized to describe various aspects of the embodiments of the invention. In order to provide a clear and consistent understanding of the specification and claims, the following definitions are provided.

As used herein, the term "load" can refer to any object, material, construction, or item that, in and of itself, may not be capable of being pulled or towed. This can include, but is not limited to, objects such as industrial equipment, including, but not limited to, generators, pumps, portable buildings, or tanks. A load can also refer to mobile homes, small buildings, shipping containers, large construction materials, and any other large and/or heavy object. Further, a load can refer to a trailer bed or trailer floor or to a vehicle in need of a temporary or permanent wheels and suspension system.

The term "wheel" is used herein merely for literary convenience. As used herein, a wheel can include a tire, rim, stub axle, and any components necessary to support or attach the tire.

The term "ground level" as used herein refers to any surface on which the wheel or wheels of an MWSA can be supported when deployed. The term can also refer to any surface on which the fender housing can be supported when the wheel or wheels of an MWSA are retracted into the wheel well.

As used herein, the term "substantially" refers to the complete or nearly complete extent or degree of an action, characteristic, property, state, structure, item, or result. For example, an object that is in a "substantially" given position, including, but not limited to, vertical, horizontal, or adjacent to or aligned with another object, would mean that the object is either completely in that position or nearly completely in that position. The exact allowable degree of deviation from absolute completeness may in some cases depend on the specific context. However, generally speaking, the nearness of completion will be so as to have the same overall result as if absolute and total completion were obtained.

The terms "about" or "approximately," as used herein, are defined as at least close to a given value or either end of a range as is necessary to still perform as described and to cover manufacturing variances, equipment tolerances, and normal variances in material, as understood by those skilled in the art.

As used herein, terms indicating relative direction or orientation, including but not limited to "upper", "lower", "top", "bottom", "vertical", "horizontal", "outer", "inner", "front", "back", and the like, are intended to facilitate description of the present invention by indicating relative orientation or direction in usual use or as generally understood, and are not intended to limit the scope of the present invention in any way to such orientations or directions.

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical, or remote.

The description herein of any aspect or embodiment of the invention using terms such as "comprising," "having," "including," or "containing" with reference to an element or elements is intended to provide support for a similar aspect or embodiment of the invention that "consists of," "consists essentially of," or "substantially comprises" that particular element or elements, unless otherwise stated or clearly contradicted by context (e.g., a composition described herein as comprising a particular element should be understood as also describing a composition consisting, or consisting essentially, of that element, unless otherwise stated or clearly contradicted by context). Use of the term "comprising" contemplates other embodiments that "consist" or "consist essentially of" the recited component(s).

Further, the present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

In addition, any reference in this specification to "one embodiment," "an embodiment," "example embodiment," "further embodiment," "alternative embodiment," "select embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The figures and descriptions of embodiments of the present invention have been simplified to illustrate elements that are relevant for a clear understanding of the invention, while eliminating, for purposes of clarity, other elements that may be well known. Those of ordinary skill in the art will recognize that such other elements may be desirable and/or beneficial to implement the present invention.

Reference will be made to the attached figures on which the same reference numerals are used throughout to indicate the same or similar components. With reference to the attached figures, which show certain embodiments of the subject invention, it can be seen that the MWSA of the subject invention can comprise a fender housing 100. Other components of the MWSA can be attached to, arranged within, and deployed or extended from the fender housing. For example, the wheel 340 can be retracted into the fender housing and deployed from the fender housing. A suspension arm 200 can be rotatably attached to the fender housing at an attachment point. An actuator 150 can be operably attached to an actuation point 220 on the suspension arm, to rotate the suspension arm on the attachment point. The suspension arm can support a suspension mechanism 250 thereon. A pivot arm 300 can be rotatably attached to the suspension arm 200 at a pivot point 310, such that the pivot arm can rotate relative to the suspension arm. A pivot arm can also have an axle bore 330 that can be utilized, with, for example, a stub axle, to support a wheel on the pivot arm. The pivot arm can further have a suspension mount 325 that operably engages with the suspension mechanism 250 on the suspension arm 200 to dampen shock and vibration from the wheel 340. Thus, the pivot arm can have three points of contact: the wheel, the suspension arm, and the suspension mechanism. Each of these general components can have one or more sub-components, which will be discussed in detail below.

Figure 10:
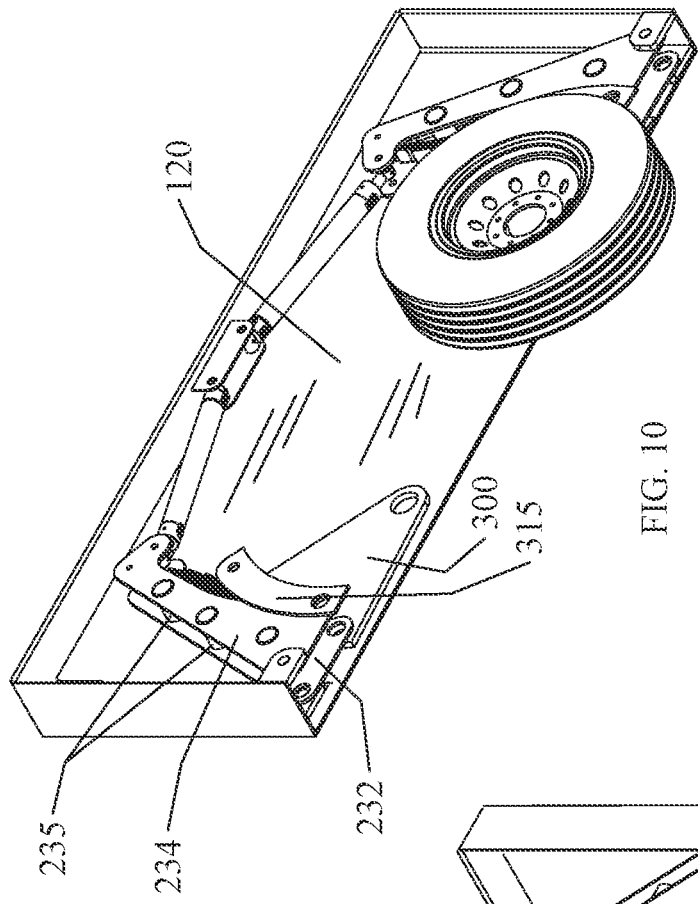
FIG. 10 illustrates a lower end, left front perspective view of an alternative embodiment of a modular wheel and suspension assembly with tandem wheels, according to the subject invention. In this view, the left wheel is not shown.

The fender housing can provide a support structure to which other components of the MWSA 50 can be operably attached. The fender housing can also provide a structure for operably attaching the MWSA to a load 25, as shown, for example, in FIGS. 3 and 15. A fender housing can comprise one or more outer frame walls 110. The frame walls can define any of a variety of shapes for the fender housing. The Figures illustrate embodiments of fender housings with a square or rectangular frame wall. Other fender housing shapes having fender walls with curves or other non-right angles are contemplated. The frame walls define a wheel well 130 in which the wheel 340 of the MWSA can be retracted or deployed therefrom, and in which the other articulating components of the MWSA can be arranged. Deployment of a wheel from the fender housing is when at least a portion of the wheel extends from the fender housing, such that the fender housing does not interfere with towing the load. The wheel well can have an inner side 132 that can be directed toward a load 25 attached to the MWSA and an outer side 134 that can be positioned away from the load. A frame wall can provide a support for one or more frame panels 120 that can cover, block, or extend across at least a portion of the inner side, as shown, for example, in FIGS. 5, 10, and 11. Either or both the frame walls and the frame panels can support components of the MWSA. In one embodiment, one or more frame panels are attached around the frame wall, leaving an open central area 136 on the inner side, as shown, for example, in FIGS. 1 and 15. This can reduce weight of the MWSA and still provide sufficient area for attachment to a load. Alternatively, the central area on the inner side can be covered by the one or more frame panels, as shown, for example, in FIGS. 9 and 10, which can provide additional area for attachment to a load.

Figure 5:
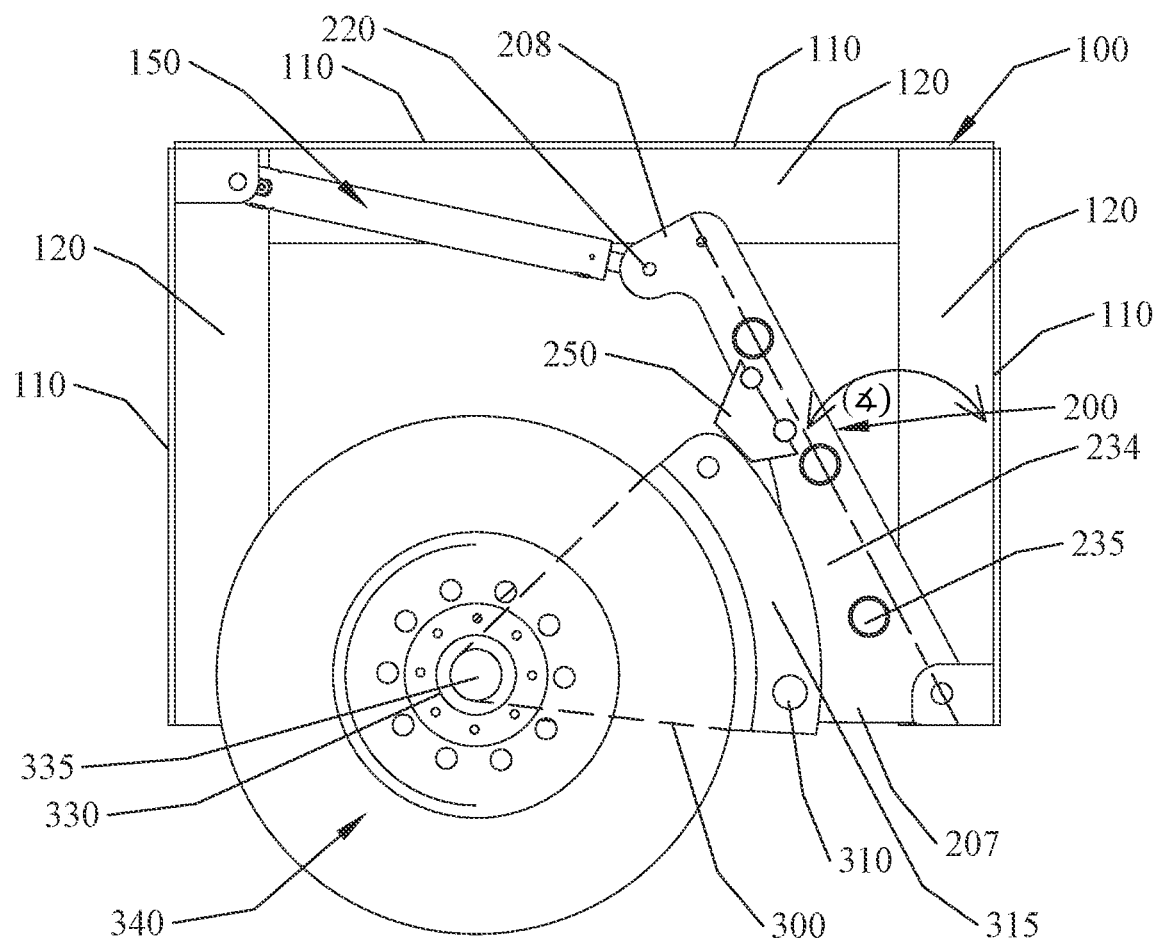
FIG. 5 illustrates a front elevation view of an embodiment of a modular wheel and suspension assembly, according to the subject invention. In this view, the front plate of the suspension arm is removed to show the suspension mechanism arranged between parallel plates. In this view, the suspension mechanism is a bump stop.
Figure 6:
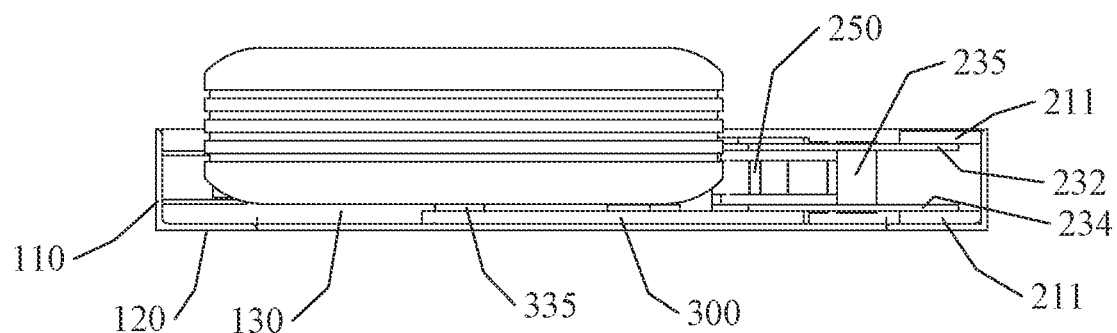
FIG. 6 illustrates a bottom plan view of an embodiment of a modular wheel and suspension assembly, according to the subject invention.
Figure 11:
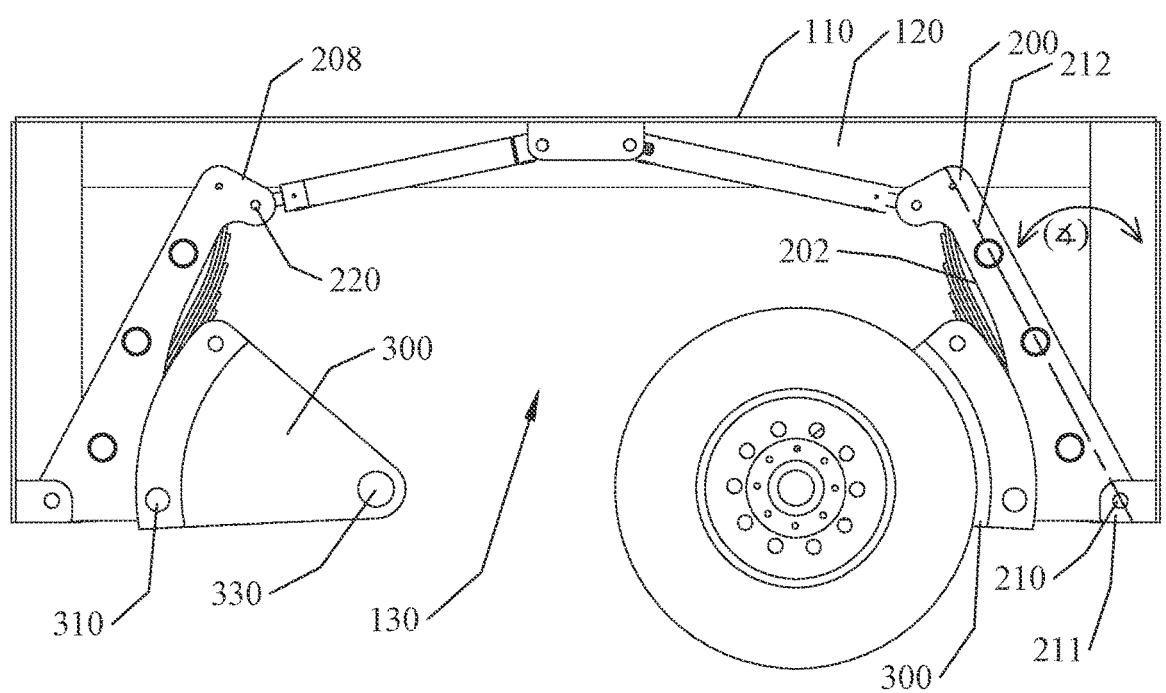
FIG. 11 illustrates a front elevation view of an alternative embodiment of a modular wheel and suspension assembly with tandem wheels, according to the subject invention. In this view, the left wheel is not shown.
Figure 14:
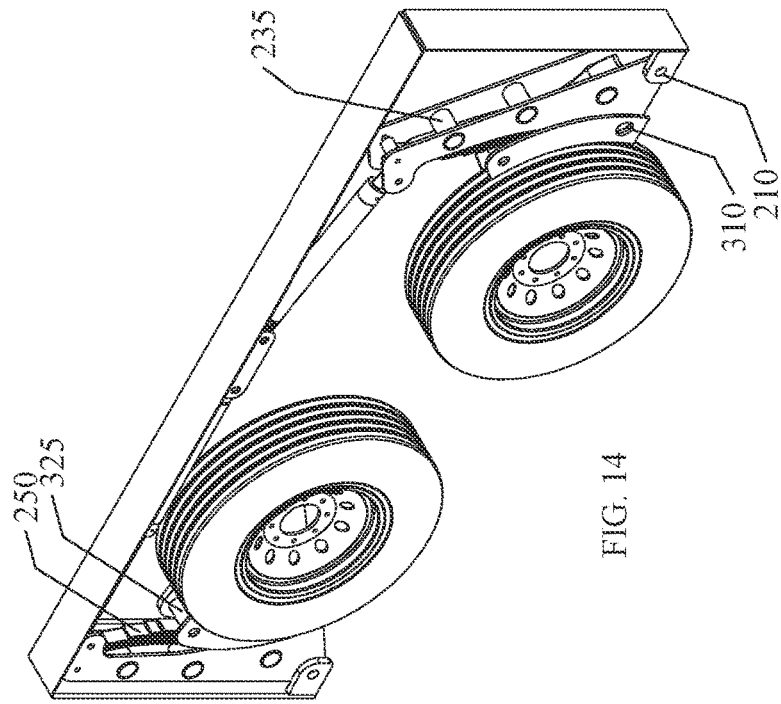
FIG. 14 illustrates an upper end, right front perspective view of an alternative embodiment of a modular wheel and suspension assembly with tandem wheels, according to the subject invention. In this view, both wheels are shown, with one being raised.
Figure 13:
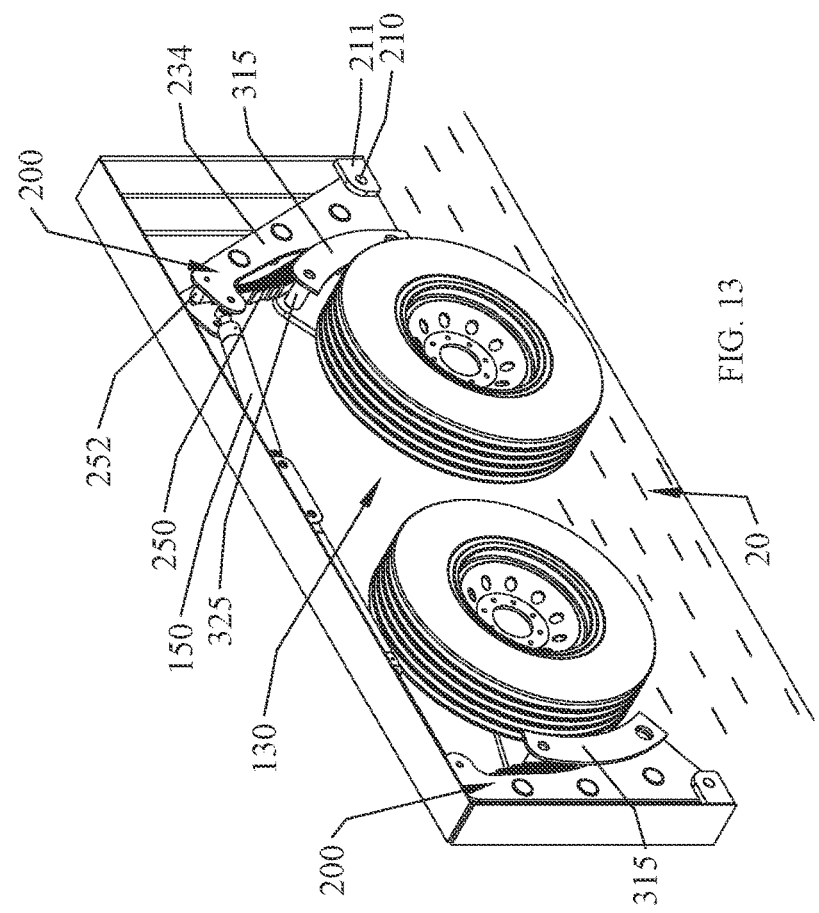
FIG. 13 illustrates an upper end, left front perspective view of an alternative embodiment of a modular wheel and suspension assembly with tandem wheels, according to the subject invention. In this view, both wheels are shown, with one being raised.

The MWSA 50 can comprise a suspension arm that can be rotatably attached to the fender housing. The other components of the MWSA can be operably attached to the suspension arm, which anchors them to the fender housing. A suspension arm can have a longitudinal length 212 between a linkage end 207 and a rotation end 208, as shown, by way of example, in FIGS. 5 and 8. At or near the linkage end there can be an attachment point 210 at which the suspension arm can be rotatably attached to the fender housing. As described in more detail below, an actuator 150 can be operably attached to an actuation point 220 on the suspension arm. The actuator can be used to control rotation of the suspension arm. In one embodiment, the actuation point is distanced from the linkage end by at least ½ of the longitudinal length. In a more particular embodiment, the actuation point is at or near the rotation end, as shown, by way of non-limiting example, in FIGS. 3 and 11. In embodiments that do not utilize a fender housing, the suspension arm can be rotatably attached directly to a load at the attachment point. The suspension arm can rotate on the attachment point. An attachment point can be located anywhere along the longitudinal length 212. Preferably, the location of the attachment point provides the suspension arm with sufficient range or angle of rotation (4) 225 for the wheel 340 to be deployed, as shown in FIGS. 5 and 11. More particularly, the location of the attachment point can allow the pivot arm 300 to rotate sufficiently to retract the wheel for kneeling a load and/or the frame housing MWSA to ground level 20, as discussed in more detail below. In one embodiment, the attachment point is at or near a lower end or lower side of the fender housing, as shown, for example, in FIGS. 5, 11, and 14.

Figure 17:
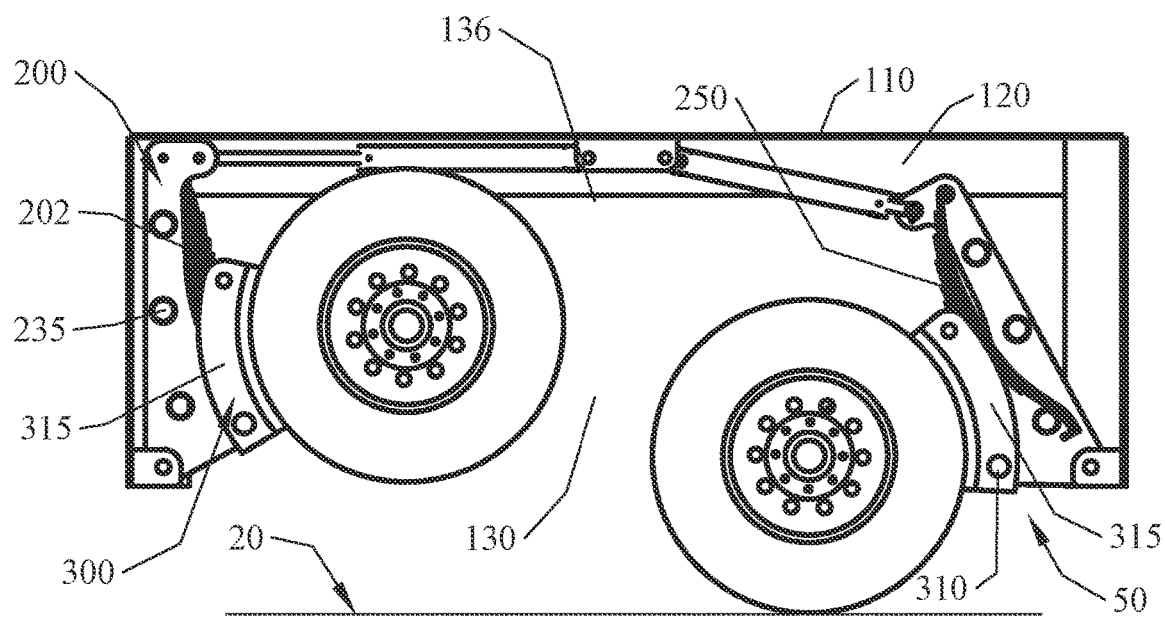
FIG. 17 illustrates a front elevation view of an alternative embodiment of a modular wheel and suspension assembly with tandem wheels, according to the subject invention. In this view, the left side wheel is shown in a raised or kneeling position. The right side wheel is shown in a deployed position and the outer side plate has been removed to show the underlying details of this embodiment.

Advantageously, the suspension arm can be arranged such that the longitudinal length thereof can have an angle of rotation (4) 225 that is directed in a more vertical direction. More specifically, the longitudinal length of the suspension arm can rotate between an angle 225 of between approximately 80° and approximately 140°, an angle of between approximately 85° and approximately 135°, or an angle of between approximately 90° and approximately 130°. As can be seen in in FIGS. 1, 8, and 17, this can beneficially position the suspension arm to a side of the wheel, which is discussed in more detail below.

Supported on the suspension arm 200 can be a suspension mechanism 250. There are any of a variety of suspension mechanisms that can be supported on a suspension arm, including, but not limited to, bump stops, helical springs, pneumatic shocks, hydraulic shocks, torsion shocks, leaf springs, combinations thereof, and other types of suspension mechanisms known to those with skill in the art. It can be preferable, though not required, to use a mechanical suspension mechanism, in keeping with the modularity of embodiments of the subject invention. A suspension mechanism 250 can be operably arranged on an inward side 202 of the suspension arm, or the side that is closest to or that faces the wheel well 130 of the fender housing, which is shown, for example, in FIGS. 7, 11, and 17.

Figure 4:
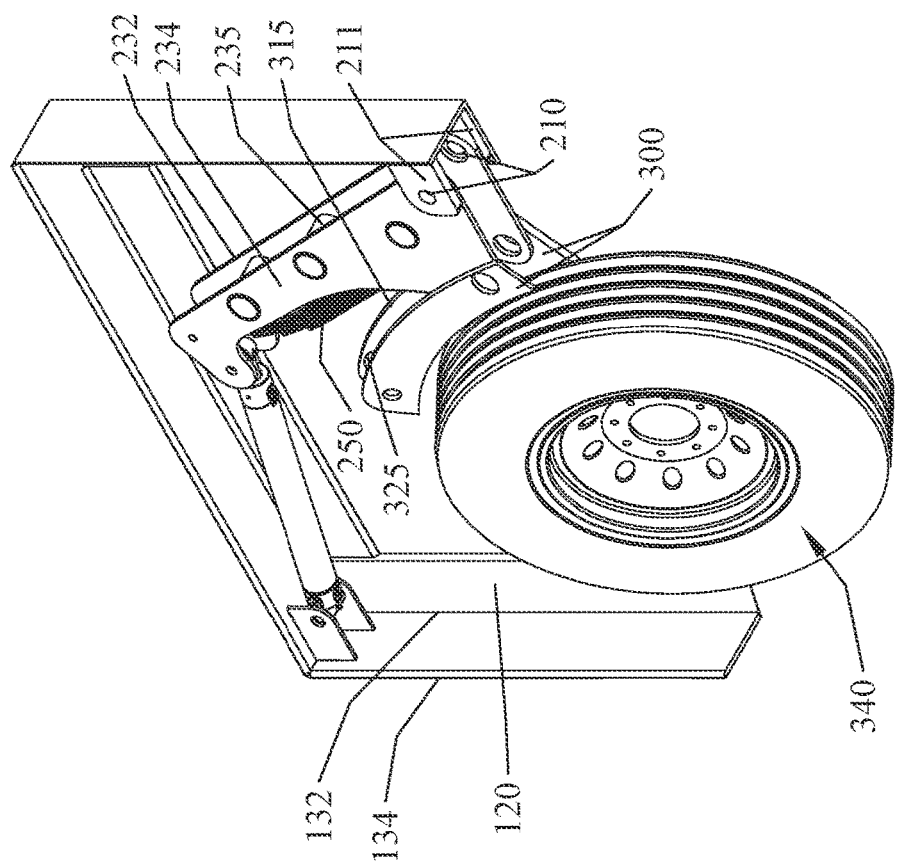
FIG. 4 illustrates a lower end, front right perspective view of an embodiment of a modular wheel and suspension assembly, according to the subject invention.

In one embodiment, a suspension arm comprises two parallel plates 230, an inner side plate 232 closer to the inner side 132 of the wheel well 130, and an outer side plate 234 closer to the outer side 134 of the wheel well. The parallel plates can be secured in a spaced relation to each other by one or more dowels 235 fixedly attached therebetween. In a further embodiment, parallel attachment points 210 on the linkage end 207 of each plate can rotatably attached to the fender housing 100. By way of example, the fender housing can comprise one or more bracket arms 211 to which the attachment points can be rotatably attached, as shown in FIGS. 4 and 16.

The separation between the parallel plates can provide a cavity 206 in which a suspension mechanism 250 can be arranged. The suspension mechanism can extend out from the cavity. Alternatively, the suspension mechanism can be contained within or at least partially within the cavity. In one embodiment, a conventional leaf spring is operably secured within the cavity between the parallel plates 230, such as shown, for example in FIGS. 5 and 15. The eyes 252 of the leaf spring, examples of which are shown in FIG. 5, can be attached in any conventional manner between the parallel plates, such as, for example, with spring hangers, shackle pins, or bolts. In a further embodiment, the body of the leaf spring, or the leaves, extend or hang down from between the plates, which can be seen at least, for example, in FIGS. 5, 8, and 11.

An MWSA 50 can also comprise a pivot arm 300. The pivot arm can be on the inward side 202 of the suspension arm and adjacent to the suspension mechanism 250, an example of which is shown in FIGS. 7, and 16. This can position the pivot arm further within the wheel well 130 of the fender housing 100 than the suspension arm, which can be closer to the fender housing. The pivot arm can have three points of contact: a pivot point 310, a suspension mount 325, and an axle bore 330. In one embodiment, these three points of contact are arranged triangularly, with the axle bore further within the wheel well or furthest away from the suspension arm. In a further embodiment, when the wheel is supported on ground level, the suspension mount and the axle bore are operably engaged and rotate around the pivot point and the axle bore is closer to ground level than when the wheel is retracted into the wheel well.

Figure 12:
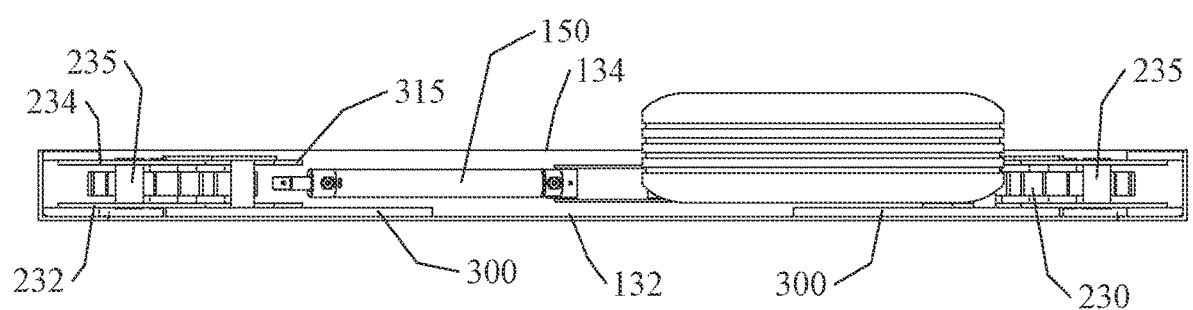
FIG. 12 illustrates a bottom plan view of an alternative embodiment of a modular wheel and suspension assembly with tandem wheels, according to the subject invention. In this view, the left wheel is not shown.

The pivot arm can be rotatably attached to the suspension arm 200 at the pivot point. In one embodiment, the pivot point is located at or near the linkage end 207 of the suspension arm, which allows the pivot arm to be rotated away from the suspension arm, an example of which can be seen in FIG. 4. The pivot arm can also be fixedly attached to the suspension arm on the inner side of the wheel well, such that the pivot arm can be closer to the load 25, as shown, for example, in FIGS. 4, 11, and 12. This can provide beneficial access to the suspension arm and the suspension mechanism. The axle bore 330 can support a wheel 340 on the pivot arm. In one embodiment, the axle bore receives a stub axle 335 to support a wheel 340 on the pivot arm. This beneficially eliminates the need for a full-length under-load axle, thereby engendering modularity to the MWSA 50. The stub axle can extend from the pivot arm toward the outer side 134 of the wheel well, which can likewise position the wheel to the outer side of the wheel well.

The pivot arm can provide a link between the wheel and the suspension mechanism on the suspension arm 200. The pivot arm can have a surface, area, or other device known in the art that can contact the suspension mechanism to dampen shock and vibration from the wheel. In one embodiment, the pivot arm has a suspension mount 325 that can engage with the suspension mechanism to dampen shock and vibration from the wheel 340. The suspension mount can be a rigid component fixedly attached to the pivot arm 300 above the pivot point 310. In a select embodiment, the suspension mount is a dowel fixedly attached to the pivot arm.

Figure 2:
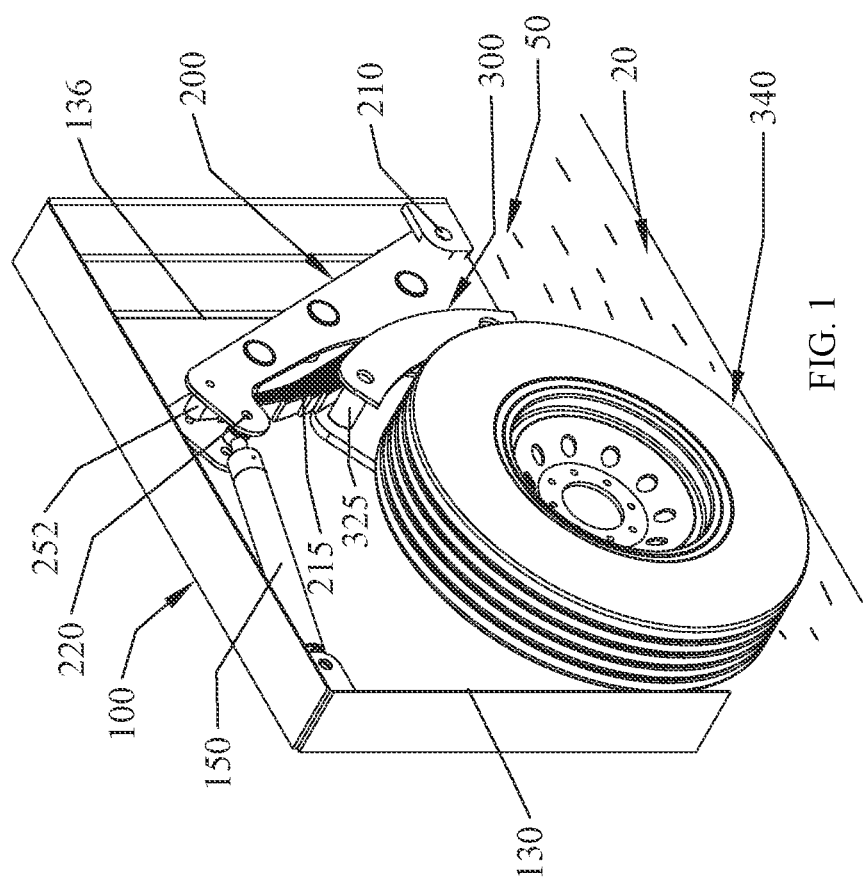
FIG. 2 illustrates an upper end, front right perspective view of an embodiment of a modular wheel and suspension assembly, according to the subject invention.
Figure 9:
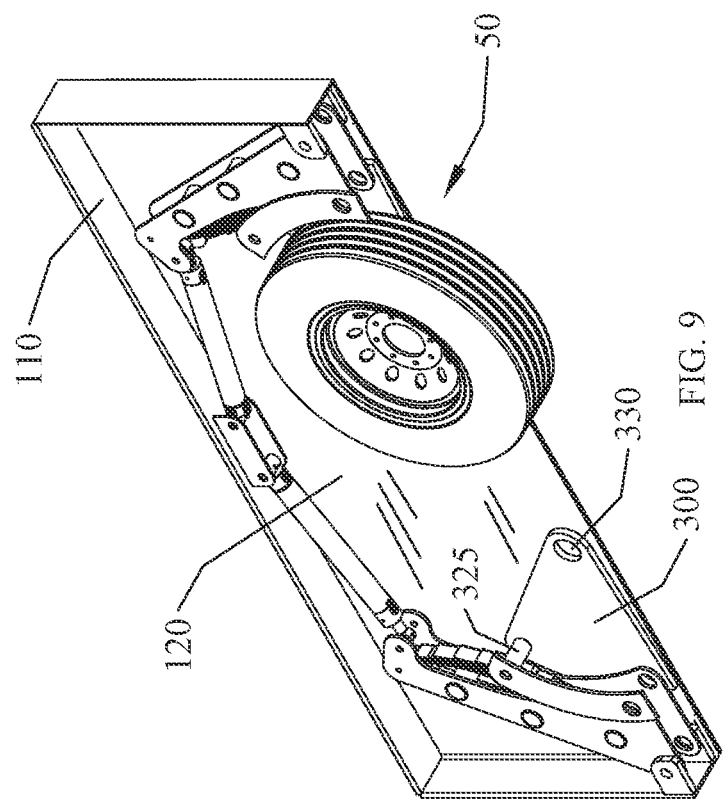
FIG. 9 illustrates a lower end, right front perspective view of an alternative embodiment of a modular wheel and suspension assembly with tandem wheels, according to the subject invention. In this view, the left wheel is not shown.
Figure 18:
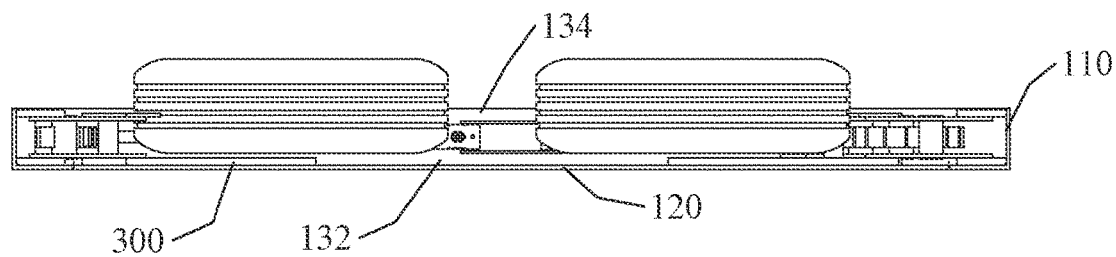
FIG. 18 illustrates a bottom side, plan view of an alternative embodiment of a modular wheel and suspension system, according to the subject invention. In this view, the left wheel is shown in a raised or kneeling position.
Figure 19:
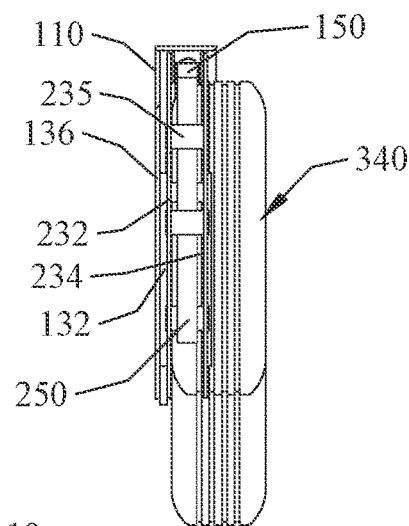
FIG. 19 illustrates a left side elevation view of an alternative embodiment of a modular wheel and suspension system, according to the subject invention. In this view, the left wheel is shown in a raised or kneeling position.

In one embodiment, the pivot arm is a plate or has a plate-like shape, examples of which can be seen in FIGS. 9 and 18. In a further embodiment, the pivot arm has support plate 315 fixedly attached to the pivot arm by the suspension mount 325 therebetween. The support plate can extend to the linkage end 207 of the suspension arm and have a pivot point 310 that can be rotatably attached to the suspension arm, lending further support to the pivot arm. In a particular embodiment, the support plate has an arcuate shape that partially circumnavigates the wheel, with the pivot point 310 being at or near the lower end of the arcuate shape, as shown, by way of example, in FIGS. 2, 8, and 17. The pivot point on the pivot arm and the pivot point on the support plate can be rotatably attached to the parallel plates 230 of the suspension arm. In a specific embodiment, the pivot point 310 on the pivot arm 300 is rotatably attached to the inner side plate 232 on the support arm and the pivot point 310 on the support plate 315 can be rotatably attached to the outer side plate 234 of the support arm. One example of this specific embodiment is shown in FIG. 9.

In the absence of an applied force on one or more of the articulating components, the MWSA can fold in or collapse on itself, such that the fender housing settles or kneels over the wheel or wheels of the MWSA therein. As the fender housing settles toward ground level 20, the wheel or wheels can be, wholly or at least partially, retracted into the wheel well, 130 which exerts force on the pivot arm 300, which is translated to the suspension mount 325 to exert force on the suspension mechanism 215 resulting in the suspension arm being rotated back or vertically toward the fender housing, an example of which is shown in FIGS. 13, 14, 15, and 16.

To raise the fender housing and deploy at least part of the wheel therefrom, an actuator can be activated to exert either a push or pull force on the suspension arm to tilt or push the suspension arm against the pivot arm 300. The actuator can be attached to an actuation point on the suspension arm. In one embodiment, the actuation point is distanced from the linkage end 207 by at least ½ of the longitudinal length. In a more specific embodiment, the actuation point is at or near the rotation end 208 of the suspension arm. With the suspension arm operably attached to the fender housing at the linkage end and to the actuator 150 operably attached to the actuation point, the suspension arm can operate as a lever against the pivot arm. Exerting force on the actuation point rotate the suspension mechanism against the suspension mount, which can act as a fulcrum causing the suspension arm to raise the fender housing and any load attached thereto. As the fender housing is raised the wheel is deployed from the fender housing or, stated another way, the wheel is at least partially exposed or uncovered from the fender housing.

Figure 3:
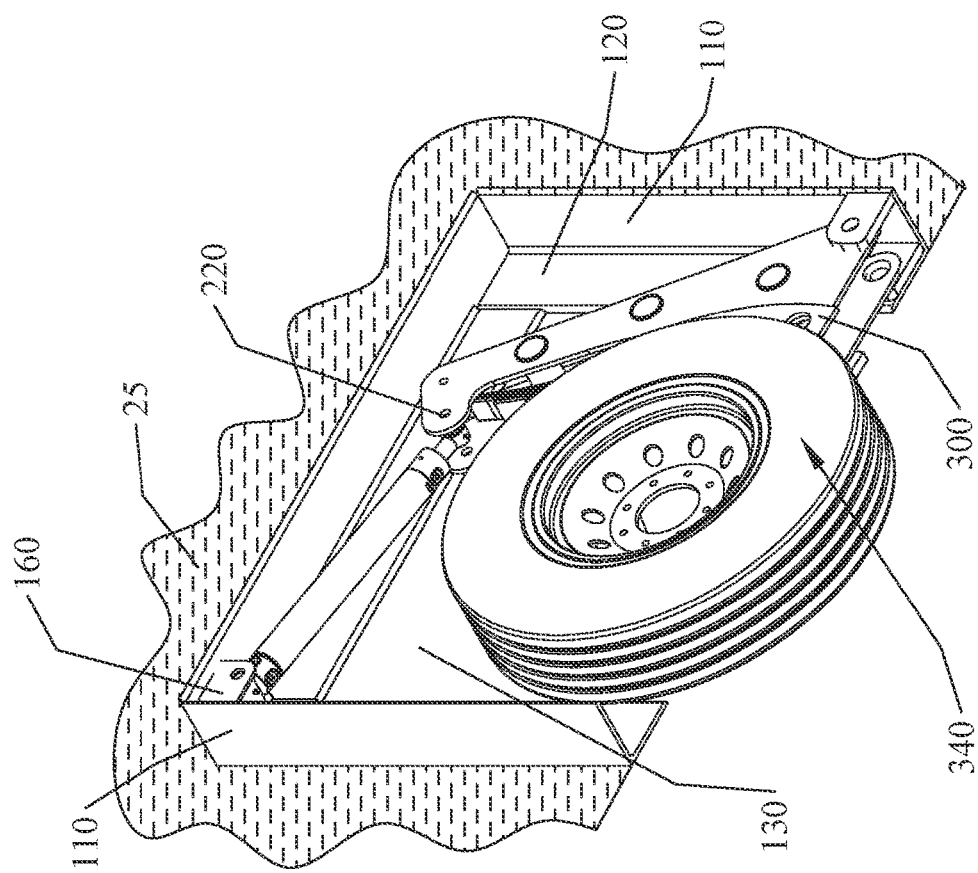
FIG. 3 illustrates a lower end, front left perspective view of an embodiment of a modular wheel and suspension assembly, according to the subject invention.

In one embodiment, a linear actuator 150 is operably arranged on the fender housing to exert force against the suspension arm 200. In a further embodiment, the linear actuator is operably arranged within the fender housing 100. A linear actuator can be any of a variety of devices known in the art, including, but not limited to single- or double-action hydraulic or pneumatic pistons, geared mechanisms, screw mechanisms, or some combination thereof capable of applying the desired force. The actuator can be arranged between the actuation point 220 on the suspension arm 200 and a support structure 160 within the wheel well 130. In one embodiment, the linear actuator is a hydraulic piston operably attached between a bracket-type support structure on the fender housing and the actuation point 220 at the rotation end 208 of the suspension arm, as shown, for example in FIGS. 3, 15, and 16. When activated, the hydraulic piston can pull the actuation point 220 forcing the suspension arm to rotate toward the pivot arm. This can exert force on the suspension mount by the suspension mechanism, which operate similar to a fulcrum. As the pull force is exerted, the rotation end is forced downward simultaneously raising the rotation end causing the fender housing and a load attached thereto, to be raised relative to the wheel sitting at ground level. If the MWSA 50 is directly attached to the load, without the fender housing, then the load would be raised relative to the wheel sitting at ground level. As the fender housing and/or the load is raised, the wheel can simultaneously be deployed from the fender housing or exposed from the fender housing. Examples of a deployed wheel configuration are shown in FIGS. 3, 11 (right side), and 17 (right side). When force is released on the rotation end 208, the suspension arm automatically rotates in the opposite direction, away from the piston arm, and as the fender housing is lowered or kneeled, the wheel is retracted into the fender housing.

Figure 20:
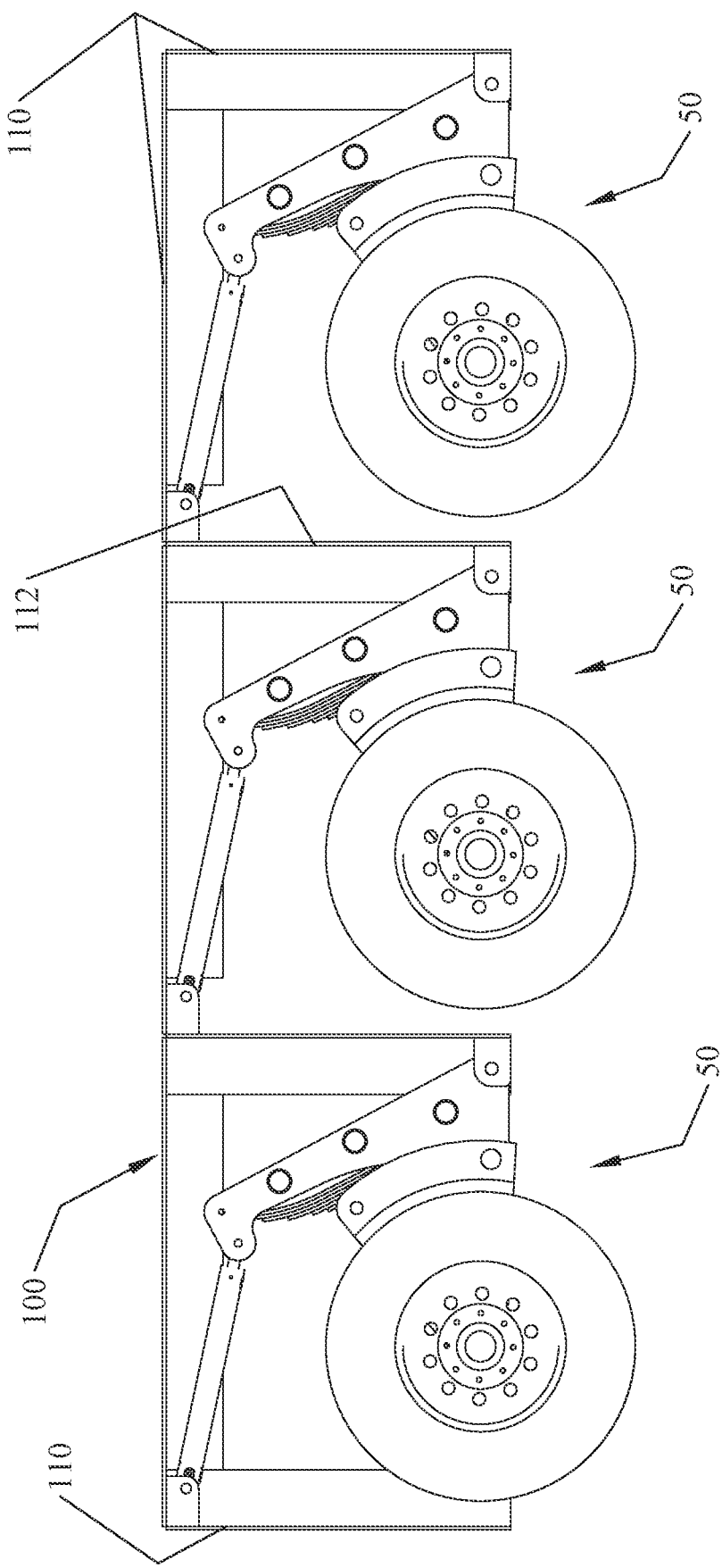
FIG. 20 illustrates an embodiment with three modular wheel and suspension systems arranged under a fender housing, according to the subject invention. In this embodiment, the modular wheel suspension systems are arranged in a right side configuration.
Figure 21:
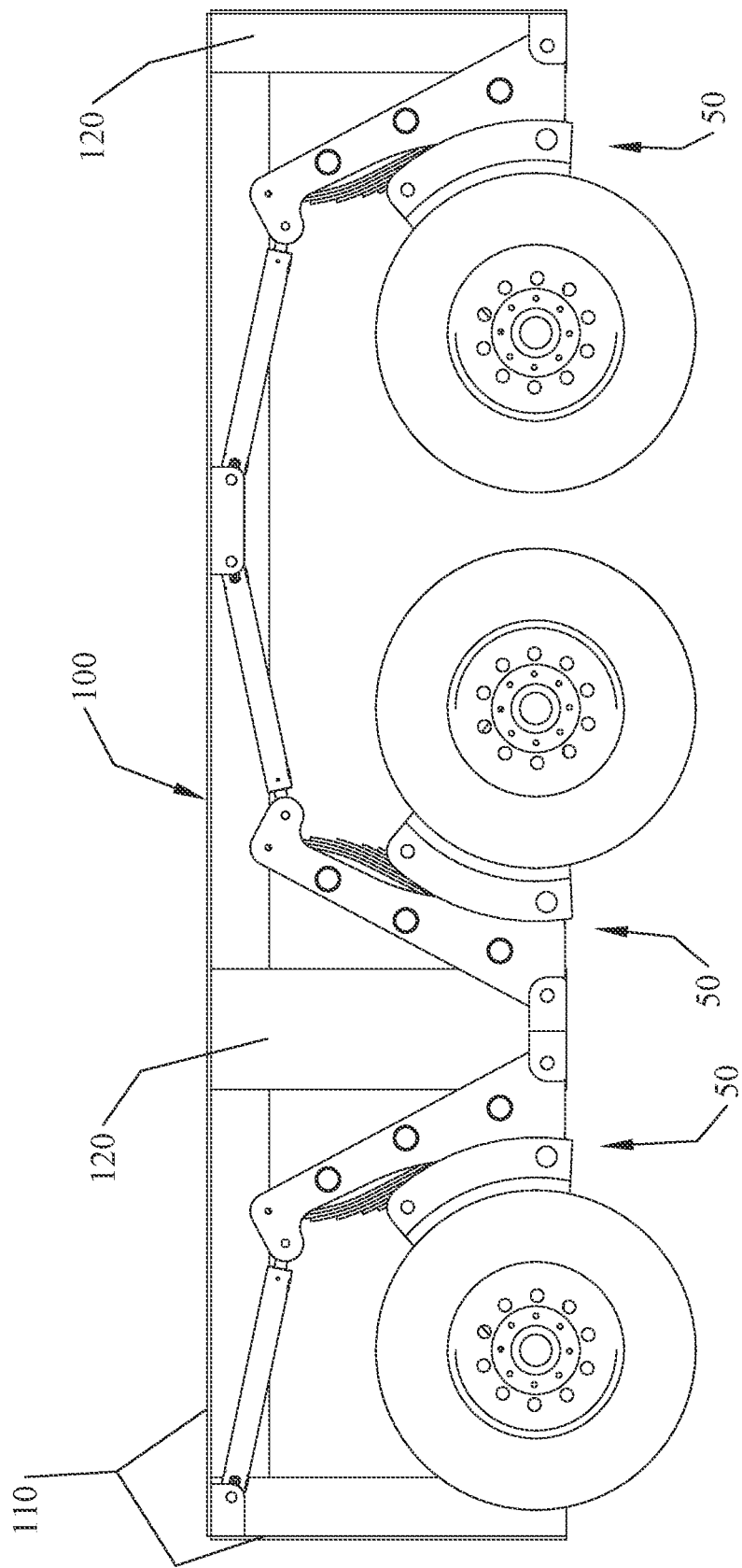
FIG. 21 illustrates an embodiment with three modular wheel and suspension systems arranged under a fender housing, according to the subject invention, wherein two have a right side configuration and the middle one has a left side configuration.

The dimensions and/or shape of a fender housing 100 can accommodate one, two, three, or more MWSAs therein. FIGS. 1-19 illustrate embodiments with one or two MWSAs where the attachment point 210 is near or on a frame wall 110. FIGS. 20 and 21 illustrate embodiments comprising a third MWSA in the fender housing. FIG. 20 shows an embodiment having an enlarged fender housing 100 comprising an interior frame wall 110 arranged between the one or more frame walls 110 on the outside of the fender housing. A third MWSA can be operably attached, as described above, within the fender housing by utilizing the interior frame wall, as shown, for example, in FIG. 20.

FIG. 21 shows an alternative embodiment, that comprises an enlarged fender housing 100 that comprises a frame panel 120 arranged to, at least partially, cover the inner side 132 of the wheel well 130. This does not preclude there being a fender wall at least partially covering or extending over the inner side of the wheel well, as shown in FIG. 20. A third MWSA can be operably attached, as described above, within the fender housing by utilizing the frame panel, as shown in FIG. 21, to support the MWSA.

As can also be seen in FIGS. 20 and 21, an MWSA can be arranged in either a left side or right side configuration, which refers to side of the wheel that the suspension arm rotates or the side on which the suspension arm is attached to the load and/or the fender housing. For example, FIG. 20 shows three MWSAs that are all arranged in a right side configuration. FIG. 21 shows an example where the two outside MWSAs are arranged in a right side configuration and the middle MWSA has a left side configuration. Thus, it can be seen that any number of MWSAs can be arranged in a variety of combinations by utilizing the one, two, and/or three MWSA combinations with either the left or right side configurations or combinations thereof.

Once a load has been attached to two or more MWSAs of the subject invention, the load can be towed by connection to a vehicle. Conventional apparatuses employ a trailer with a tongue, which can have a single (FIG. 22), double attachment (FIG. 23), or additional attachments to a load. The tongue can have a hitch coupler, or other mechanism at the proximal end that rotatably couples to a trailer ball on a vehicle, which is not shown, but readily understood by a person of skill in the art. Ideally, when attached to the ball hitch the tongue can be substantially horizontal and aligned with the body of the towing vehicle. Other apparatuses can also be utilized for connecting a load to a vehicle, other than the typical ball hitch system, but a common characteristic of all these apparatuses is at least some rotation freedom around the point where the trailer tongue connects to the vehicle. The connection of the load to a vehicle typically requires at least 4-degrees of freedom, so the tongue and load can rotate horizontally and vertically. There are limits to such rotational freedom, as an ordinary person of skill in the art will understand.

To facilitate rotation of the tongue when a load is kneeled with an MWSA of the subject invention, a rotary tongue system 400 can be incorporated with the MWSA 50. With the rotary tongue system, a load supported on two or more MWSAs can be raised to a height for towing and can also be kneeled to ground level or any point therebetween for kneeling a load to ground level. A rotary tongue system can provide temporary rotational capability between the trailer body as well as between the trailer tongue and the hitch on the vehicle. This can allow the load to kneel fully to the ground level while still attached to vehicle hitch. Thus, the MWSA 50 for lowering the load to ground level can incorporate a rotary tongue system.

Figure 22:
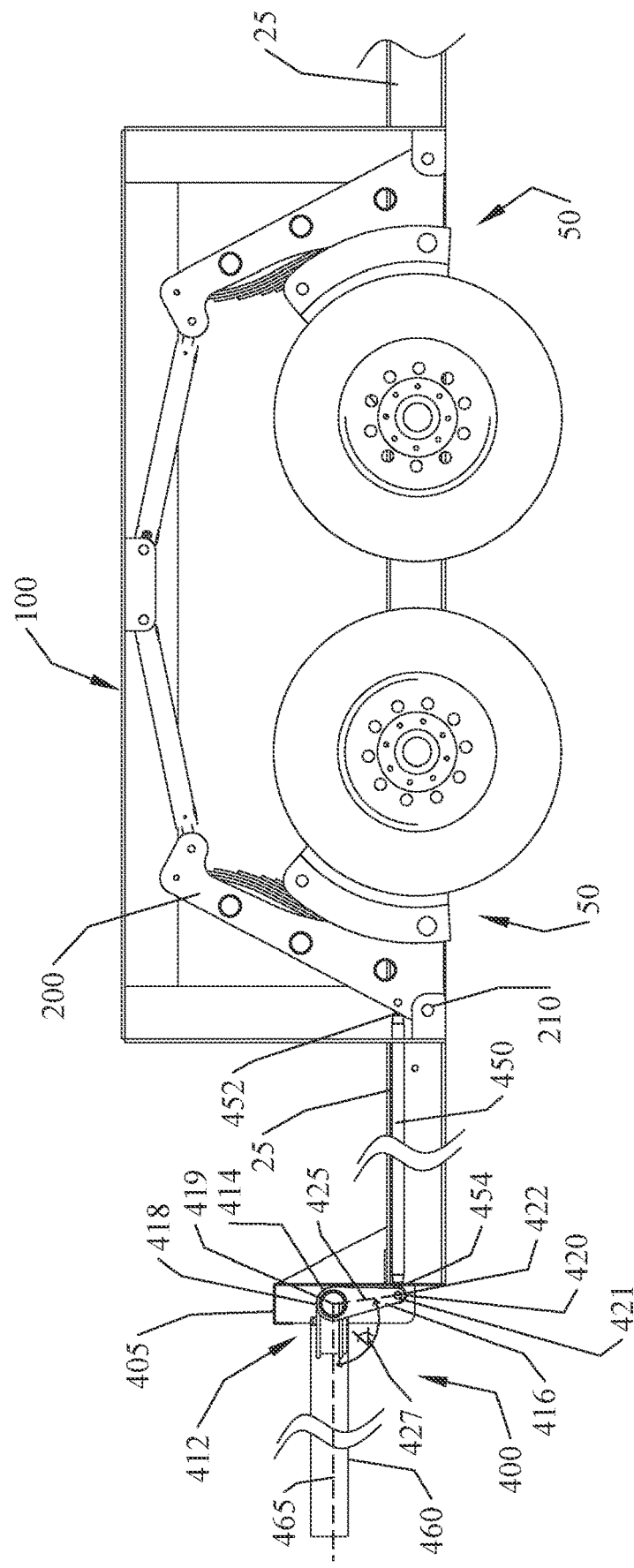
FIG. 22 illustrates a side elevation view of an embodiment of a modular wheel and suspension system that has an operable connection to a rotary tongue system, according to the subject invention.

A rotary tongue system 400 can include a rotary tongue 412 and at least one tongue lever 416. The tongue lever can be used to secure the position of the rotary tongue for towing, by inhibiting rotation of the rotary tongue, and, when unsecured, allows the load to be kneeled to ground level when the rotary tongue rotates. In a further embodiment, the rotary tongue system comprises a stabilizer arm 430 that operates simultaneously with the suspension arm 200 of the MWSA to secure the tongue lever. FIGS. 22 and 23 show a non-limiting example of a rotary tongue system with a tongue lever.

The rotary tongue 412 of a rotary tongue system 400 can include a tongue 460 having a front end with conventional components for rotatable attachment to a towing vehicle. For example, the front end of the tongue can have components for connecting to a ball hitch. At the back end, the tongue can be immovably attached to a rotary bracket 414. A rotary bracket can be an elongated tube, rod, pipe, or the like arranged perpendicular to the tongue 460, as illustrated in FIGS. 22 and 23. The tongue 460 and the rotary bracket 414 together comprise the rotary tongue 412, which is shown, for example, in FIGS. 22 and 23. The rotary bracket can be rotatably connected within a tongue housing 405, which can be utilized to attach the rotary bracket system 400 to the front end of a load 25. For example, FIG. 22 shows a rotary tongue and a MWSA 50 operably attached to a generic load. FIG. 23 shows a rotary tongue and a MWSA operably attached to load that is a trailer.

The rotary bracket can rotate forwards and backwards or, said another way, clockwise and counterclockwise along a longitudinal length 430, as is indicated, for example, in FIG. 23. This allows the front end of the fixedly attached rotary tongue 412 of the rotary tongue system 400 to be raised or lowered or, said another way, to move clockwise or counterclockwise. This further allows the back end of the rotary tongue 412 to follow with or lower with the kneeling load and can, preferably, allow the load to be kneeled to ground level with the rotary tongue 412 still attached to a vehicle.

The rotary tongue system 400 can include at least one tongue lever 416 fixedly attached to the rotary bracket 414. In a further embodiment, the tongue lever is fixedly attached at or near the rotary bracket end 415, as shown, for example, in FIG. 23. A tongue lever 416 can have a rotary end 418, with a center of rotation 419, and a stabilizer end 420 that can also have a center of rotation 422. The rotary end can be fixedly attached to the rotary bracket 414, such that the center of rotation 419 can rotate with the rotary bracket. The stabilizer end can be distanced from the rotary end, such that when the rotary end rotates the stabilizer end also rotates and the center of rotation 422 has a wider arc or larger radius than that of the rotary end. FIGS. 22 and 23 illustrate embodiments of a tongue lever arranged with the stabilizer end positioned below or nearer to ground level 20 than the rotary end. This could be reversed, with the rotary end below the stabilizer end or nearer to ground level. This is not shown in the figures, but would be readily understood by a person of skill in the art.

A line of operational distance 425, between the center of rotation 419 of the rotary end 418 and the center of rotation 422 of the stabilizer end 420, can form an angle ∡ 427 with the center line 465 of the tongue 460. This angle, among other factors known to those with skill in the art, can determine the maximum angle of rotation of the rotary tongue. In one embodiment, the line of operational distance 425 forms an angle of attachment ∡ 427 with the center line 465 of the tongue 460, as illustrated in FIG. 24, which is at least about 45°, 50°, 55°, 60°, 65°, 70°, 75°, 85°, 90°, 95°, 100°, 105°, 110°, 115°, 120°, 125°, 130°, 135° and/or an angle between any two of the listed values. The angle of attachment allows the center line of the tongue to rotate, relative to ground level 20, to an angle that is at least about 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, and/or 45°, or a rotation capability between any two of the listed values.

When the rotary tongue rotates the back of the tongue 460, nearest the load, toward ground level 20, to facilitate kneeling of the load, the stabilizer end 420 of the tongue lever 416 can rotate forward or away from the load. Conversely, when the rotary tongue rotates the back of the tongue upwards, to raise the load, the stabilizer end can rotate back or toward the load. It can be undesirable for the rotary tongue to freely rotate as a load is being actively towed. Therefore, in one embodiment, the stabilizer end 420 of the tongue lever 416 is secured to maintain the tongue in a substantially horizontal position for towing. The stabilizer end can be secured to the tongue housing 405 by any of a variety of devices and techniques known to those with skill in the art. By way of a non-limiting example, the tongue lever can be secured to the tongue housing by means of a pin or bolt (not shown) through a bore hole 421 at the stabilizer end. In one embodiment, the stabilizer point is at the center of rotation 422 of the stabilizer end, which is shown, for example, in FIGS. 22 and 23. With this embodiment, the MWSA can operate independently of the rotary tongue system 400.

It can be seen that a position of the tongue 460 can be dependent on the height of the load. If the load is at a height for towing, the tongue can be substantially horizontal. If, however, the load is kneeled by the MWSA, the rotary tongue 412 advantageously allows for rotation to accommodate the back end being lowered with the load. Thus, the disposition of the MWSA can affect the angle of the tongue. Therefore, it can be beneficial if the rotary tongue system 400 is operably connected to the MWSA, allowing the operation of the MWSA to control the operation and position of the rotary tongue system.

To provide control of the rotary tongue to the MWSA, the rotary tongue system 400 can further comprise a stabilizer arm 450 that can operably connect to the MWSA. In a more specific embodiment, the stabilizer arm 450 operably connects between the tongue lever 416 and the suspension arm 200 of the MWSA 50. This can allow the actuator 150 of the MWSA, through the suspension arm 200, to manipulate the tongue and the rotation and positioning thereof. Further, the stabilizer arm can secure or hold the tongue lever 416 in place when the load 25 is raised above ground level or lowered to ground level. In other words, the MWSA can control the rotation of the rotary tongue 412 and can secure the position of the rotary tongue at towing height, ground level, or anywhere in between.

In one embodiment, a back end 452 of the stabilizer arm, or the end nearest the load 25, is rotatably attached to the suspension arm 200 at a stabilizer point 260, examples of which are shown in FIGS. 22 and 23. In a specific embodiment, where the suspension arm comprises parallel plates 230, the back end of the stabilizer arm is rotatably attached to stabilizer points 260 on one or both the parallel plates. In a still more specific embodiment, the stabilizer point is a dowel 235, as discussed above, arranged between the parallel plates 230 and the stabilizer arm can be rotatably attached to the dowel. It can be preferable for connections between the MWSA and the rotary tongue system to have a minimum of hysteresis, which can provide more precise control of the MWSA and, consequently, the rotary tongue system.

To employ an MWSA 50 of the subject invention, the load 25 to be towed can be positioned on a surface, which can be, but is not limited to, ground level. The MWSA can be placed adjacent thereto. If the MWSA is at the proper height relative to the load, it can be attached to the load. Alternatively, the height of the MWSA can be adjusted with the actuator or manually for attachment to the load. In another alternative, if the fender housing is not utilized with the MWSA, the height of the linkage end 207 can be adjusted, if necessary, with the actuator or manually to the desired height for attachment to the load at the attachment point 210.

After attachment of the MWSA to the load and, optionally, any hydraulics or pneumatics are connected to functionalize the actuator, the suspension arm can be rotated with the actuator to raise the fender housing and/or the load to a height for towing. To remove the MWSA, the load can be lowered to ground level and the MWSA disconnected. In embodiments where the rotary tongue system is operably attached to the MWSA, raising or lowering the MWSA simultaneously rotates the tongue, such that the back end 452 thereof will be lowered or kneeled or raised to the desired height. The front end 454 of the tongue can, advantageously, be operably attached to the towing vehicle during operation of the MWSA whether or not the rotary tongue system is rotatable attached thereto.

While embodiments of an MWSA can be utilized on a load to eliminate the need for a trailer, this does not preclude their use on a trailer or other vehicle. They can be particularly advantageous for attachment to a trailer because they can permit the trailer floor or trailer bed to be placed at ground level for loading. They also reduce weight by eliminating the use of a full cross-body axle. Further, the ability of the pivot arm to rotate away from the suspension arm can make for easier repairs. In a particularly advantageous use, multiple MWSAs can be attached to each side of a trailer bed or trailer floor. The MWSAs can be activated individually to create a ramp with the trailer bed or trailer floor for loading.

The modular wheel and suspension system (MWSA) of the subject invention can provide an efficient, safe, and easy option towing a load. Modifying a load with an MWSA eliminates the need for trailer by imparting independent towability to a load. The configuration of the components makes the MWSA easy to repair. The ability to combine multiple MWSAs on a load make it useful in almost any circumstance where it would be more beneficial to tow a load without a trailer.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

I claim:

1. A modular wheel and suspension assembly (MWSA), configured to be attached to a load, comprising:
    a suspension arm comprising a linkage end and a rotation end, wherein an attachment point, an actuation point, and a pivot point are arranged therebetween, and wherein the attachment point is below the actuation point;
    a suspension mechanism supported on the suspension arm;
    a pivot arm rotatably attached to the suspension arm at the pivot point, the pivot arm comprising an axle bore, configured to support a wheel, and a suspension mount above the pivot point that operably engages with the suspension mechanism;
    an actuator operably attached to the actuation point of the suspension arm, wherein the actuator rotates the suspension arm against the pivot arm; and
    a fender housing that defines a wheel well, configured to be attached to the load, wherein the suspension arm, pivot arm, and actuator are operably arranged within the wheel well.

2. The modular wheel and suspension assembly, according to claim 1, wherein the suspension mechanism is at least one of a leaf spring, a bump stop, a helical spring, a pneumatic shock, a hydraulic shock, and a torsion shock.

3. The modular wheel and suspension assembly, according to claim 1, wherein the suspension arm comprises two parallel plates secured in a spaced relation with a dowel attached therebetween, and the suspension mechanism is arranged between the parallel plates.

4. The modular wheel and suspension assembly, according to claim 3, wherein the pivot arm further comprises a support plate secured in a spaced relation to the pivot arm with a dowel attached therebetween.

5. The modular wheel and suspension assembly, according to claim 4, wherein the dowel between the pivot arm and the support plate comprises the suspension mount.

6. The modular wheel and suspension assembly, according to claim 1, wherein the suspension arm has a longitudinal length that has an angle of rotation of between approximately 80° and approximately 140°.

7. The modular wheel and suspension assembly, according to claim 1, wherein the actuator comprises at least one of a single-action hydraulic cylinder and a double-action hydraulic cylinder.

8. A method for towing a load, the method comprising:
    obtaining a load having attached thereto a modular wheel and suspension assembly, according to claim 1,
    activating the actuator to rotate the suspension arm against the pivot arm, such that the suspension mount and the suspension mechanism are abutted, the axle bore, with a wheel configured thereon, is pushed toward ground level to deploy the wheel from the wheel housing, and the fender housing is simultaneously raised above ground level thereby raising the load attached thereto.

9. The method according to claim 8, further comprising:
    activating the actuator to allow the suspension arm to rotate away from the pivot arm, such that the fender housing and the load attached thereto are lowered and the axle bore, with the wheel configured thereon, is retracted into the wheel well.

10. The modular wheel and suspension assembly, according to claim 1, wherein the suspension arm has a longitudinal length that has an angle of rotation of between approximately 85° and approximately 135°.

11. The modular wheel and suspension assembly, according to claim 1, wherein the suspension arm has a longitudinal length that has an angle of rotation of between approximately 90° and approximately 130°.

12. A modular wheel and suspension assembly (MWSA), configured to be attached to a load, comprising:
    a suspension arm comprising a linkage end and a rotation end, wherein an attachment point, an actuation point, a stabilizer point, and a pivot point are arranged therebetween, and wherein the attachment point is below the actuation point;
    a suspension mechanism supported on the suspension arm;
    a pivot arm rotatably attached to the suspension arm at the pivot point, the pivot arm comprising an axle bore, configured to support a wheel, and a suspension mount above the pivot point that operably engages with the suspension mechanism;
    an actuator operably attached to the actuation point of the suspension arm, wherein the actuator rotates the suspension arm against the pivot arm;
    a fender housing, configured to be attached to a load, wherein the fender housing comprises a wheel well in which the suspension arm, pivot arm, and actuator are operably arranged;
    a rotary tongue system comprising;
    a rotary tongue comprising a tongue, configured to be attached to a vehicle, a rotary bracket attached to the tongue, and a tongue lever comprising a rotary end that is attached to the rotary bracket and a stabilizer end, wherein a force applied to the stabilizer end causes the tongue lever to rotate the rotary bracket thereby rotating the tongue; and
    a stabilizer arm operably attached between the stabilizer end of the tongue lever and the stabilizer point on the suspension arm that is configured to apply force to the stabilizer end of the tongue lever.

13. The modular wheel and suspension assembly, according to claim 12, wherein the suspension mechanism is at least one of a leaf spring, a bump stop, a helical spring, a pneumatic shock, a hydraulic shock, and a torsion shock.

14. The modular wheel and suspension assembly, according to claim 12, wherein the suspension arm comprises two parallel plates secured in a spaced relation with a dowel attached therebetween, and the suspension mechanism is arranged between the parallel plates.

15. The modular wheel and suspension assembly, according to claim 14, wherein the pivot arm further comprises a support plate secured in spaced relation to the pivot arm with a dowel attached therebetween.

16. The modular wheel and suspension assembly, according to claim 15, wherein the dowel between the pivot arm and the support plate comprises the suspension mount.

17. The modular wheel and suspension assembly, according to claim 12, wherein the suspension arm has a longitudinal length that has an angle of rotation of between approximately 80° and approximately 140°.

18. The modular wheel and suspension assembly, according to claim 12, wherein the actuator comprises at least one of a single-action hydraulic cylinder and a double-action hydraulic cylinder.

19. The modular wheel and suspension assembly, according to claim 12, wherein a center line of the tongue and a line of operational distance of the tongue lever have an angle therebetween of at least about 45°, 50°, 55°, 60°, 65°, 70°, 75°, 80°, 85°, 90°, 95°, 100°, 105°, 110°, 115°, 120°, 125°, 130°, or 135°.

20. The modular wheel and suspension assembly, according to claim 19, wherein the center line of the tongue rotates, relative to a ground level, to angle that is at least about 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, or 45°.

21. A method for towing a load, the method comprising:
    obtaining a load comprising a modular wheel and suspension assembly, according to claim 12;
    utilizing the actuator to apply a force to the actuation point to rotate the suspension arm;
    rotating the suspension arm, with the actuator, to engage the suspension mechanism thereon with the suspension mount on the pivot arm;
    pushing the suspension mechanism against the suspension mount to continue rotation of the suspension arm and move the axle bore, configured with a wheel thereon, toward ground level;
    deploying the wheel by pushing the suspension mechanism against the suspension mount until at least a part of the wheel is pushed out of the fender housing; and
    raising the fender housing, attached to the suspension arm, above ground level simultaneously with deploying the wheel, thereby raising the load attached to the fender housing.

22. The method according to claim 21, further comprising:
    utilizing the actuator to rotate the suspension arm away from the pivot arm, thereby releasing the force applied to the suspension mount by the suspension mechanism;
    allowing the pivot arm to rotate with the suspension arm, thereby retracting the wheel into the wheel housing; and
    lowering the fender housing over the wheel simultaneously with the wheel being retracted, thereby lowering the load attached to the fender housing.

23. The modular wheel and suspension assembly, according to claim 12, wherein the suspension arm has a longitudinal length that has an angle of rotation of between approximately 85° and approximately 135°.

24. The modular wheel and suspension assembly, according to claim 12, wherein the suspension arm has a longitudinal length that has an angle of rotation of between approximately 90° and approximately 130°.

25. A modular wheel and suspension assembly, configured to be attached to a load, comprising:
    a suspension arm comprising a linkage end and a rotation end, and further comprising an attachment point, an actuation point, configured to be operably connected to an actuator, and a pivot point that are arranged on the suspension arm between the linkage end and the rotation end, wherein the attachment point is below the actuation point on the suspension arm and is utilized to rotatably attach the suspension arm to the load;
    a suspension mechanism supported on the suspension arm;
    a pivot arm rotatably attached to the suspension arm at the pivot point and comprising a suspension mount, wherein the suspension mount is above the pivot point and operably engages with the suspension mechanism and an axle bore, configured to support a wheel; and
    a rotary tongue comprising,
        a tongue, configured to be attached to a vehicle,
        a rotary bracket attached to the tongue,
        a tongue lever comprising a rotary end that is attached to the rotary bracket and a stabilizer end, and
        a stabilizer arm operably attached between the stabilizer end of the tongue lever and the suspension arm,
    such that, when the actuator exerts a force on the actuation point, the suspension arm rotates toward the pivot arm, thereby engaging the suspension mechanism against the suspension mount to push the wheel toward ground level, which simultaneously raises the load attached at the attachment point and pulls the stabilizer end toward the suspension arm, thereby lowering the tongue to a position for towing.

* * * * *

UNITED STATES PATENT AND TRADEMARK OFFICE
CERTIFICATE OF CORRECTION

PATENT NO. : 11,878,560 B1  
APPLICATION NO. : 18/204418  
DATED : January 23, 2024  
INVENTOR(S) : Richard Leslie Williamson Page 1 of 1

It is certified that error appears in the above-identified patent and that said Letters Patent is hereby corrected as shown below:

In the Specification

<u>Column 7,</u>  
Line 32, "MWSA of the" should read --MWSA 50 of the--.

<u>Column 8,</u>  
Line 56, "(4) 225" should read --(4)·225--.

Signed and Sealed this  
Ninth Day of July, 2024

Katherine Kelly Vidal  
*Director of the United States Patent and Trademark Office*